US 8,990,312 B2

(12) United States Patent
Wilson

(10) Patent No.: US 8,990,312 B2
(45) Date of Patent: *Mar. 24, 2015

(54) ACTIVE E-MAIL FILTER WITH CHALLENGE-RESPONSE

(75) Inventor: Brian Wilson, Palo Alto, CA (US)

(73) Assignee: SonicWALL, Inc., San Jose, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 11/927,414

(22) Filed: Oct. 29, 2007

(65) Prior Publication Data

US 2008/0168145 A1 Jul. 10, 2008

Related U.S. Application Data

(63) Continuation of application No. 10/197,393, filed on Jul. 16, 2002, now Pat. No. 8,898,238.

(51) Int. Cl.
G06F 15/16 (2006.01)
G06Q 10/10 (2012.01)
H04L 12/58 (2006.01)

(52) U.S. Cl.
CPC ............ *G06Q 10/107* (2013.01); *H04L 12/585* (2013.01); *H04L 51/12* (2013.01)
USPC .......................................... 709/206

(58) Field of Classification Search
USPC .......................... 709/206, 207, 204
See application file for complete search history.

(56) References Cited

U.S. PATENT DOCUMENTS 5,877,761 A * 3/1999 Shoji et al. .................... 715/784
5,999,929 A 12/1999 Goodman
6,023,723 A * 2/2000 McCormick et al. ......... 709/206
6,026,491 A * 2/2000 Hiles ............................... 726/18
6,052,709 A 4/2000 Paul
6,055,508 A 4/2000 Naor et al.
6,072,942 A 6/2000 Stockwell et al.
6,076,101 A 6/2000 Kamakura et al.
6,112,227 A * 8/2000 Heiner .......................... 709/203
6,199,102 B1 * 3/2001 Cobb ............................ 709/206

(Continued)

FOREIGN PATENT DOCUMENTS

CA         2274352      * 12/2000      ............. H04L 12/22

OTHER PUBLICATIONS

Open Mail Relay, obtained from Internet at: http://en.wikipedia.org/wiki/Open_mail_relay on Oct. 14, 2010.*

(Continued)

*Primary Examiner* — Backhean Tiv
(74) *Attorney, Agent, or Firm* — Lewis Roca Rothgerber LLP

(57) ABSTRACT

When a user receives potential junk e-mail from an unknown sender address, an active filter installed in or cooperating with the user's e-mail system sends a challenge e-mail back to the sender address. Unless the user receives a correct response e-mail from the sender address and/or a response that meets formal criteria, the active filter rejects the original e-mail and blocks future e-mail from that sender address. The challenge preferably includes a question that the sender must correctly answer in his response. The question is such that only humans can interpret and respond to it correctly. For example, the question may relate to and/or be incorporated in an image in the challenge. Lists of approved and blocked sender addresses are compiled. The user may directly enter addresses in the address lists. Addresses to which the user has sent e-mail may also be included directly in the approved list.

18 Claims, 6 Drawing Sheets

(56) References Cited

U.S. PATENT DOCUMENTS

| | | | |
|---|---|---|---|
| 6,234,802 B1* | 5/2001 | Pella et al. .................... 434/156 |
| 6,266,692 B1 | 7/2001 | Greenstein |
| 6,321,267 B1 | 11/2001 | Donaldson |
| 6,393,465 B2 | 5/2002 | Leeds |
| 6,421,709 B1 | 7/2002 | McCormick et al. |
| 6,424,997 B1 | 7/2002 | Buskirk et al. |
| 6,438,690 B1 | 8/2002 | Patel et al. |
| 6,453,327 B1 | 9/2002 | Nielsen |
| 6,460,073 B1 | 10/2002 | Asakura |
| 6,539,092 B1 | 3/2003 | Kocher et al. |
| 6,546,416 B1* | 4/2003 | Kirsch ....................... 709/206 |
| 6,563,912 B1 | 5/2003 | Dorfman et al. |
| 6,615,424 B1 | 9/2003 | Cheng |
| 6,640,301 B1* | 10/2003 | Ng ............................. 713/156 |
| 6,643,686 B1 | 11/2003 | Hall |
| 6,650,890 B1 | 11/2003 | Irlam et al. |
| 6,654,787 B1 | 11/2003 | Aronson et al. |
| 6,691,156 B1* | 2/2004 | Drummond et al. .......... 709/206 |
| 6,708,205 B2* | 3/2004 | Sheldon et al. .............. 709/206 |
| 6,728,378 B2 | 4/2004 | Garib |
| 6,732,149 B1 | 5/2004 | Kephart |
| 6,760,752 B1* | 7/2004 | Liu et al. ..................... 709/206 |
| 6,772,196 B1 | 8/2004 | Kirsch et al. |
| 6,775,691 B1 | 8/2004 | Kubik et al. |
| 6,778,941 B1 | 8/2004 | Worrell et al. |
| 6,779,021 B1 | 8/2004 | Bates et al. |
| 6,829,635 B1 | 12/2004 | Townshend |
| 6,836,750 B2 | 12/2004 | Wong et al. |
| 6,842,773 B1 | 1/2005 | Ralston et al. |
| 6,851,051 B1* | 2/2005 | Bolle et al. .................. 713/168 |
| 6,868,498 B1 | 3/2005 | Katsilkas |
| 6,876,977 B1 | 4/2005 | Marks |
| 6,931,433 B1 | 8/2005 | Ralston et al. |
| 6,941,348 B2 | 9/2005 | Petry et al. |
| 6,957,348 B1* | 10/2005 | Flowers et al. ................ 726/23 |
| 6,963,928 B1 | 11/2005 | Bagley et al. |
| 6,965,919 B1 | 11/2005 | Woods et al. |
| 7,003,724 B2 | 2/2006 | Newman |
| 7,006,993 B1 | 2/2006 | Cheong et al. |
| 7,016,875 B1 | 3/2006 | Steele et al. |
| 7,016,877 B1 | 3/2006 | Steele et al. |
| 7,039,949 B2* | 5/2006 | Cartmell et al. .................. 726/6 |
| 7,050,110 B1* | 5/2006 | Lienhart et al. ............... 348/474 |
| 7,072,943 B2 | 7/2006 | Landesmann |
| 7,076,241 B1 | 7/2006 | Zondervan |
| 7,127,405 B1* | 10/2006 | Frank et al. .................... 705/1 |
| 7,149,778 B1 | 12/2006 | Patel et al. |
| 7,171,450 B2 | 1/2007 | Wallace et al. |
| 7,178,099 B2 | 2/2007 | Meyer et al. |
| 7,194,515 B2* | 3/2007 | Kirsch ....................... 709/206 |
| 7,206,814 B2 | 4/2007 | Kirsch |
| 7,231,428 B2 | 6/2007 | Teague |
| 7,249,175 B1* | 7/2007 | Donaldson ................... 709/225 |
| 7,275,082 B2 | 9/2007 | Pang |
| 7,275,095 B1 | 9/2007 | Lebouill |
| 7,293,063 B1 | 11/2007 | Sobel |
| 7,299,261 B1 | 11/2007 | Oliver et al. |
| 7,343,624 B1 | 3/2008 | Rihn et al. |
| 7,359,948 B1 | 4/2008 | Ralston et al. |
| 7,441,277 B2 | 10/2008 | Burges |
| 7,539,726 B1 | 5/2009 | Wilson et al. |
| 7,660,737 B1* | 2/2010 | Lim et al. .................... 705/14.49 |
| 7,908,330 B2 | 3/2011 | Oliver et al. |
| 7,921,204 B2 | 4/2011 | Wilson et al. |
| 8,090,778 B2 | 1/2012 | Malik et al. |
| 8,296,382 B2 | 10/2012 | Wilson |
| 8,396,926 B1 | 3/2013 | Oliver et al. |
| 8,510,839 B2* | 8/2013 | Tarbotton et al. ............... 726/24 |
| 8,527,337 B1* | 9/2013 | Lim et al. .................... 705/14.35 |
| 8,732,256 B2 | 5/2014 | Oliver |
| 8,774,463 B2* | 7/2014 | Boncyk et al. ................ 382/103 |
| 2001/0044803 A1 | 11/2001 | Szutu |
| 2001/0047391 A1 | 11/2001 | Szutu |
| 2002/0032740 A1 | 3/2002 | Stern et al. |
| 2002/0046275 A1 | 4/2002 | Crosbie et al. |
| 2002/0087573 A1 | 7/2002 | Reuning et al. |
| 2002/0087719 A1 | 7/2002 | Katoh |
| 2002/0116463 A1 | 8/2002 | Hart |
| 2002/0162025 A1 | 10/2002 | Sutton et al. |
| 2002/0188689 A1 | 12/2002 | Michael |
| 2002/0199095 A1 | 12/2002 | Bandini et al. |
| 2003/0009526 A1 | 1/2003 | Bellegarda et al. |
| 2003/0023692 A1 | 1/2003 | Moroo |
| 2003/0023736 A1* | 1/2003 | Abkemeier ................... 709/229 |
| 2003/0041126 A1 | 2/2003 | Buford et al. |
| 2003/0041280 A1 | 2/2003 | Malcolm et al. |
| 2003/0046421 A1 | 3/2003 | Horvitz et al. |
| 2003/0069933 A1 | 4/2003 | Lim et al. |
| 2003/0105827 A1 | 6/2003 | Tan et al. |
| 2003/0149726 A1 | 8/2003 | Spear |
| 2003/0158903 A1 | 8/2003 | Rohall et al. |
| 2003/0158905 A1 | 8/2003 | Petry et al. |
| 2003/0163357 A1 | 8/2003 | Engleman et al. |
| 2003/0167311 A1 | 9/2003 | Kirsch |
| 2003/0191816 A1* | 10/2003 | Landress et al. .............. 709/219 |
| 2003/0195764 A1 | 10/2003 | Baker et al. |
| 2003/0195937 A1 | 10/2003 | Kircher et al. |
| 2003/0196116 A1 | 10/2003 | Troutman |
| 2003/0204569 A1 | 10/2003 | Andrews |
| 2003/0229672 A1 | 12/2003 | Kohn |
| 2003/0233418 A1* | 12/2003 | Goldman ..................... 709/206 |
| 2003/0233540 A1* | 12/2003 | Banerjee et al. ............... 713/153 |
| 2003/0236847 A1 | 12/2003 | Benowitz et al. |
| 2004/0003283 A1* | 1/2004 | Goodman et al. ............. 713/201 |
| 2004/0015554 A1* | 1/2004 | Wilson ....................... 709/206 |
| 2004/0024639 A1 | 2/2004 | Goldman |
| 2004/0030776 A1 | 2/2004 | Cantrell et al. |
| 2004/0059786 A1 | 3/2004 | Caughey |
| 2004/0078340 A1* | 4/2004 | Evans ........................... 705/64 |
| 2004/0083270 A1 | 4/2004 | Heckerman et al. |
| 2004/0103160 A1 | 5/2004 | Sheldon et al. |
| 2004/0117451 A1 | 6/2004 | Chung |
| 2004/0158554 A1 | 8/2004 | Trottman |
| 2004/0167964 A1 | 8/2004 | Rounthwaite et al. |
| 2004/0177120 A1 | 9/2004 | Kirsch |
| 2004/0243844 A1 | 12/2004 | Adkins |
| 2005/0055410 A1 | 3/2005 | Landsman et al. |
| 2005/0081059 A1 | 4/2005 | Bandini et al. |
| 2005/0114705 A1 | 5/2005 | Reshef et al. |
| 2005/0125667 A1 | 6/2005 | Sullivan et al. |
| 2005/0172213 A1 | 8/2005 | Ralston et al. |
| 2005/0182959 A1 | 8/2005 | Petry et al. |
| 2005/0256841 A1 | 11/2005 | Rawat et al. |
| 2006/0010217 A1 | 1/2006 | Sood |
| 2006/0015563 A1 | 1/2006 | Judge et al. |
| 2006/0031346 A1 | 2/2006 | Zheng et al. |
| 2006/0036693 A1 | 2/2006 | Hulten et al. |
| 2006/0095528 A1 | 5/2006 | Sykes, Jr. |
| 2006/0282888 A1 | 12/2006 | Bandini et al. |
| 2007/0027992 A1 | 2/2007 | Judge et al. |
| 2007/0083606 A1 | 4/2007 | Malik et al. |
| 2008/0016579 A1 | 1/2008 | Pang |
| 2008/0168145 A1* | 7/2008 | Wilson ....................... 709/206 |
| 2008/0196084 A1* | 8/2008 | Hawkes ......................... 726/2 |
| 2008/0271116 A1 | 10/2008 | Robinson et al. |
| 2010/0325728 A1 | 12/2010 | Pang |
| 2011/0016050 A1* | 1/2011 | Evans ........................... 705/44 |
| 2011/0231503 A1 | 9/2011 | Wilson |
| 2013/0024916 A1* | 1/2013 | Evans ........................... 726/5 |
| 2013/0191480 A1 | 7/2013 | Oliver |
| 2013/0339458 A1* | 12/2013 | Wilson et al. ................. 709/206 |
| 2014/0032540 A1* | 1/2014 | Lim et al. ..................... 707/723 |
| 2014/0207892 A1 | 7/2014 | Oliver |

OTHER PUBLICATIONS

U.S. Appl. No. 10/422,359, Wilson et al, unpublished.

Anon., "The Lifecycle of Spam," PC Magazine, Feb. 25, 2003, pp. 74-97.

Bryan,Georgantopoulous, "MScin Speech and Language Processing Dissertation: Automatic summarizing based on sentence extraction: A statistical approach," Department of Linguistics, University of Edinburgh, http://cgi.di.uoa.gr/~bryon/msc.html.

(56) References Cited

OTHER PUBLICATIONS

D.H. Lie, "Sumatra: A system for Automatic Summary Generation," http://www.carptechnologies.nl/SumatraTWLT14paper/SumatraTWLT14.html.
Anon., "Correspondence Negotiation Protocol," http://ww.cs.sfu.ca/~cameron/CNP.html.
Anon., "Cloudmark, Different Approaches to Spamfighting," Whitepaper, Version 1.0, Nov. 2002.
Anon., "DigiPortal Software, Creating Order from Chaos," Support, Frequently Asked Questions, http://ww/digiportal.com/support/choicemail/faq.html.
Paul Hoffman et al., "Unsolicited Bulk Email: Mechanisms for Control," Internet Mail Consortium Report: UBE-SOL, IMCR-008, revised May 4, 1998.
Satheesh Kolathur et al., "Spam Filter, A collaborative Method of Eliminating Spam," Whitepaper, published Dec. 8, 2000, http://www.cs.uh.edu/~kolathur/Paper.htm.
Anon., "Challenge Messages," Mailblocks, http://suport.mailblocks.com/tab_howto/Validation/detail_privacy_challenge.asp.
Anon., "How Challenge/Response Works," http://about.mailblocks.com/challenge.html.
Razor-agents 2.22, http://razor.sourceforge.net.
Anon., "Project: Vipul's Razor: Summary," http://sourceforge.net/projects/razor/.
Spamarrest, The Product, How it Works, http://spamarrest.com/products/howitworks.jsp.
SpamAssassin, "Welcome to SpamAssassin," http://spamassassin.org.
"Hash Function," http://en.wikipedia.org/wiki/Hash_value, last accessed Nov. 15, 2006.
"Giant Company Software Announces Full Integrated AOL Support for it Popular Spam Inspector Anti-Spam Software," GIANT Compnay Software, Inc., 2002.
Jason Mastaler, "Tagged Message Delivery Agent (TMDA)," TDMA Hompage, 2003.
"Digital Signature," http://www.cnet.com/Reources/Info/Glossary/Terms/digitalsignature.html, last accessed Nov. 15, 2006.
"Active SMTP White Paper," ESCOM Corp. 2000-2006.
Anon., "Tagged Message Delivery Agent (TMDA)," http://tmda.net/index.html.
Cranor, Lorrie, et al., "Spam!," Communications of the ACM, vol. 41, Issue 8, pp. 74-83, Aug. 1998.
Jung, Jaeyeon, et al., "An Empirical Study of Spam Traffic and the Use of DNS Black Lists," IMC'04, Taormina, Sicily, Italy, Oct. 25-27, 2004.
Weinstein, Lauren, "Spam Wars," Communications of the ACM, vol. 46, Issue 8, p. 136, Aug. 2003.
Gomes, Luiz, et al., "Characterizing a Spam Traffic," in the Proc. of the 4th ACM SIGCOMM Conference on Internet Measurement, Sicily, Italy, pp. 356-369, 2004.
Gabrilovich et al., "The Homograph Attack", Communications of the ACM, 45(2):128, Feb. 2002.
Balvanz, Jeff, et al., "Spam Software Evaluation, Training, and Support: Fighting Back to Reclaim the Email Inbox," in the Proc. of the 32nd Annual ACM SIGUCCS Conference on User Services, Baltimore, MD, pp. 385-387, 2004.
Anon., "Giant Company Software announces full integrated AOL support for its popular Spam Inspector anti-spam software," http://giantcompany.com/pressReleases.aspx.
Langberg, Mike, "Spam Foe Needs Filter of Himself," (Email Thread Dated Apr. 5, 2003).
McCullagh, Declan, "In-Boxes that Fight Back," News.com, May 19, 2003.
"Majordomo FAQ," Oct. 20, 2001.
Dwork, Cynthia, et al. "Pricing via Processing or Combating Junk Mail," Crypto '92, Springer-Verlag LNCS 740, pp. 139-147, 1992.
Von Ahn, Luis, et al., "Telling Humans and COmputers Apart (Automatically) or How Lazy Cryptographers do AI," Communications to the ACM, Feb. 2004.
Skoll, David F., "How to Make Sure a Human is Sending You Mail," Google Groups Thread (Nov. 17, 1996).
Byrne, Julian, "My Spamblock," Google Groups Thread (Jan. 19, 1997).
Guilmette, Ronald F., "To Mung or Not to Mung," Google Groups Thread (Jul. 24, 1997).
Templeton, Brad, "Viking-12 Junk E-Mail Blocker," (believed to have last been updated Jul. 15, 2003).
How to make sure a human is sending you mail Posted by Brandon Hume, Nov. 15, 1996 00:41:49, http://groups.google.ca/broup/news.admin.net.usenet/msg/e601783e8f40c545.
"Setting up Email Spam Filters using Microsoft Outlook" BershireNet Support print out www.berkshire.net/support/filters_msoutlook.html as archived on Nov. 8, 2002, 12 pages.
Final Office Action for U.S. Appl. No. 13/080,638 dated Mar. 9, 2012.
Office Action for U.S. Appl. No. 13/080,638 dated Feb. 27, 2012.
U.S. Appl. No. 10/197,393 Final Office Action dated Mar. 28, 2008.
U.S. Appl. No. 10/197,393 Office Action dated Jun. 21, 2007.
U.S. Appl. No. 10/197,393 Final Office Action dated Nov. 27, 2006.
U.S. Appl. No. 10/197,393 Office Action dated Sep. 1, 2006.
U.S. Appl. No. 10/197,393 Final Office Action dated Mar. 3, 2006.
U.S. Appl. No. 10/197,393 Office Action dated Jul. 26, 2005.
U.S. Appl. No. 10/387,352 Final Office Action dated Oct. 22, 2008.
U.S. Appl. No. 10/387,352 Office Action dated Apr. 11, 2008.
U.S. Appl. No. 10/387,352 Final Office Action dated Jul. 13, 2007.
U.S. Appl. No. 10/387,352 Office Action dated Nov. 20, 2006.
U.S. Appl. No. 10/422,359 Office Action dated Jun. 18, 2008.
U.S. Appl. No. 10/422,359 Final Office Action dated Feb. 8, 2007.
U.S. Appl. No. 10/422,359 Office Action dated Sep. 14, 2006.
U.S. Appl. No. 10/197,393 Office Action mailed Sep. 3, 2013.
U.S. Appl. No. 13/787,693 Office Action mailed Nov. 13, 2013.
U.S. Appl. No. 10/197,393 Final Office Action mailed Dec. 27, 2013.
U.S. Appl. No. 10/197,393 Office Action mailed Apr. 28, 2014.
U.S. Appl. No. 14/226,598, Office Action mailed Jul. 21, 2014.
U.S. Appl. No. 13/658,777, Office Action mailed Oct. 3, 2014.
US 8,898,238, 11/2014, Wilson (withdrawn)

\* cited by examiner

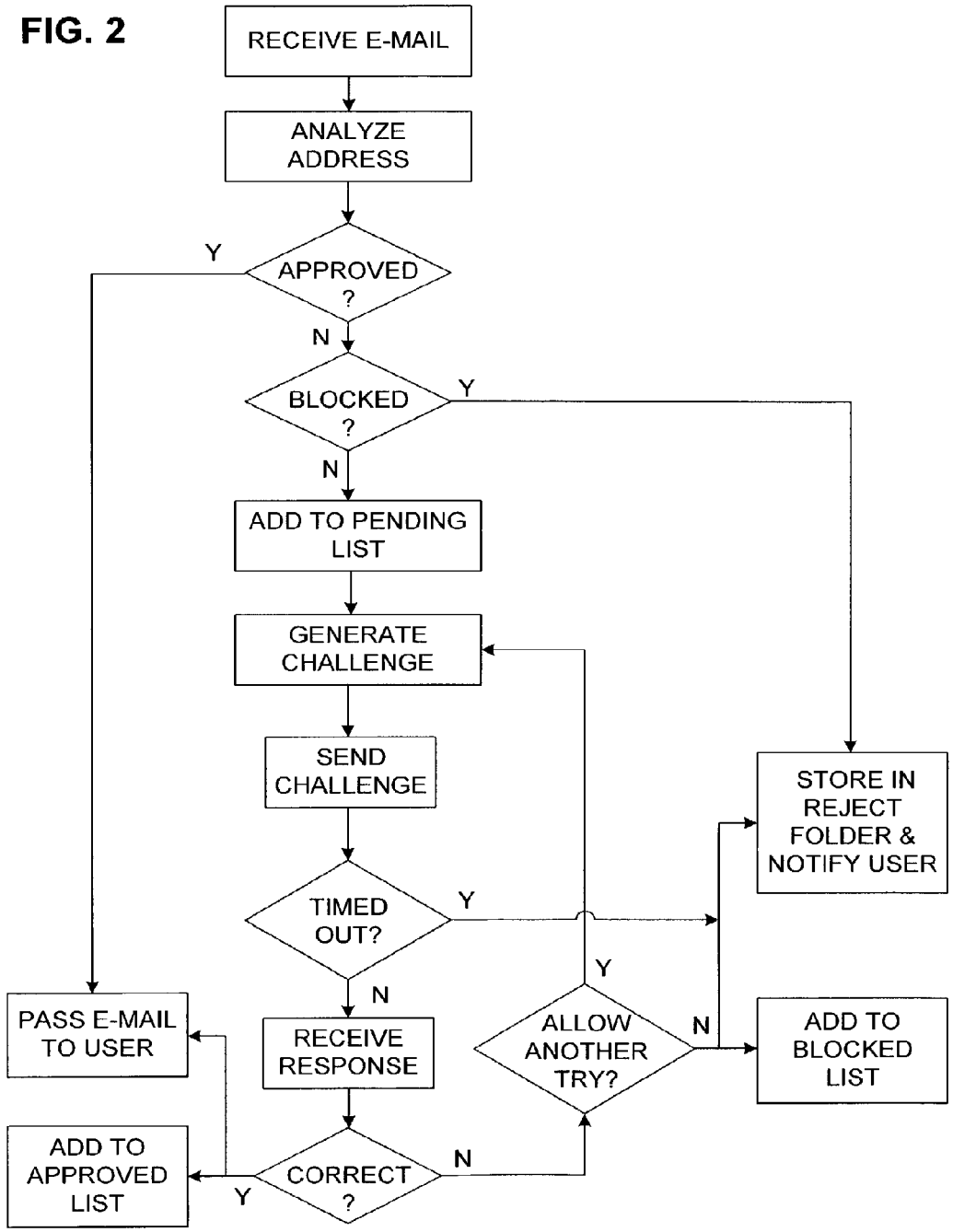

ACTIVE E-MAIL FILTER WITH CHALLENGE-RESPONSE

CROSS-REFERENCE TO RELATED APPLICATIONS AS FOLLOWS

This application, is a continuation and claims the priority benefit of U.S. patent application Ser. No. 10/197,393 now U.S. Pat. No. 8,898,238 filed Jul. 16, 2002 and entitled "Active E-Mail Filter with Challenge-Response," the disclosure of which is incorporated herein by reference for all purposes.

BACKGROUND OF THE INVENTION

1. Field of the Invention

This invention relates to a system and method for eliminating or at least reducing the amount of unwanted electronic mail messages sent to users of e-mail.

2. Description of Related Art

As the use of electronic mail (e-mail) has grown, so too has the amount of unwanted e-mail. This unwanted e-mail, commonly referred to as "junk e-mail" or "spam," is usually, but not always, some form of solicitation to buy some product or service.

Junk e-mail in the "Inbox" of e-mail programs is analogous to the "junk mail" that fills many mail boxes. The analogy is not perfect, however. Perhaps the greatest difference, besides the obvious difference in media, is that the marginal cost of sending junk e-mail to one more recipient is essentially nil, whereas an address label must be printed and postage must be paid for each additional piece of junk mail sent through normal postal channels. Indeed, the alarming growth of the junk e-mail industry depends on this cost efficiency. Even millions of e-mail addresses can be obtained relatively cheaply, especially since many organizations that have complied such lists for other reasons are often happy to get the "free" money that is to be had simply by selling them. Even absent such straightforward purchase, less scrupulous "junk e-mailers" can still get at addresses by using known computer programs that gain access to and download address lists from servers. Even more disturbingly, junk e-mailers can also launch programs that cause central e-mail servers themselves to propagate the junk e-mail to their own customers.

That junk e-mail is almost universally hated is of little concern to its creators, once again because of the negligible cost: Assume that 9,999 out of 10,000 who receive an e-mail solicitation for a $100 service are irate at having received it at all, but that one actually buys the service. If the junk e-mailer manages to transmit just a million junk e-mails with the solicitation, then he will still have made $10,000, which is typically far more than it would cost to generate the solicitation. Moreover, note that there are even on-line companies that specialize in sending junk e-mail on behalf of others, usually for only a few hundred dollars, thereby reducing the cost of sending mass junk e-mail even further. Even these companies send junk e-mail advertising their service, which constitutes junk e-mail that advertises a service to enable others to send junk e-mail!

It is not just countless recipients of junk e-mail who would like to rid the e-mail system of it: The hundreds of millions of junk e-mail messages sent every day (and perhaps every hour or minute) represent a waste of the bandwidth of the network (usually Internet) and thus a loss to e-mail service providers as well.

There are at present many different systems that attempt to filter out junk e-mail. Some of these systems are incorporated in the user's e-mail program itself, others are installed in the central e-mail server, and still others are separate applications that the user must load into his computer.

Using perhaps the most common system, when a user receives unwanted e-mail, he may direct his e-mail application to put the sender's address in a "blocked" list. Future messages from the same address are then prevented from reaching the user's Inbox, and are instead sometimes routed to a special junk e-mail folder for optional review by the user. The weakness of this filtering method is that junk e-mailers can easily change the address but keep the same domain name. The junk e-mail will then pass this simple filter. Thus, the sender address "aaa@junk.ext" might be blocked, but "aab@junk.ext" will not be.

One improvement over simple address filtering is therefore to filter based on domain names. There are two weaknesses to this approach. First, it is possible to change the "Reply to" or "From" address of a sent e-mail message. Automatically generated, fake domain names can therefore be sent along with junk e-mail to bypass domain name-based filters. Second, junk e-mailers often misappropriate common domain names, especially if the junk e-mail is being sent by a "Trojan Horse" program from within a widely used e-mail server; users may not want to block all e-mail from that domain.

Other known junk e-mail filters examine the routing information that accompanies each e-mail in an attempt to identify the original address from which the e-mail was sent. This will still not work when the e-mail is sent from within a central "trusted" server. Even so, junk e-mailers may also use known techniques to cause their messages to be sent through different proxy servers and thereby to disguise their origin.

The "Active SMTP" technology of Escom Corp. represents another approach, according to which a sending e-mail host is probed while it is connected to the recipient's server. If the sending host is a dial-up risk, or an open relay, or is configured not to accept incoming e-mail (typically indicative of a forged address), then the Active SMTP system distrusts the sending host and rejects its e-mail. This system has at least two specific weaknesses: First, it will not block unwanted e-mail such as blatant commercial advertisements if the sender is using regular e-mail sent from a properly configured mail server. Second, this system works only when the sending server is connected to the recipient server; consequently, such a system is not suitable for installation on users' local computer systems that download e-mail from a remote server.

Still other known junk e-mail filters examine not just addresses and routings, but rather (or in addition) some aspect of the content of the messages. Content is usually found either in the "subject line" of the message, or the main text of the message, or both. It may also be found in the message header. Assume such a filter is installed in a central e-mail server. If a filter program notices that a million pending e-mail messages all have the same subject line, or have message texts with identical wording, then it is almost certain that these messages are junk e-mail and can be blocked and deleted. To defeat such filters, junk e-mail senders typically add random strings of characters in the subject line (usually after many blank spaces or asterisks to make them less obvious to recipients) or at the bottom of the texts. Character-by-character or word-by-word comparison of any two of the junk messages will therefore show them to be different, although the only difference is the meaningless, random character strings included specifically to defeat the filters.

Other "tricks" used by senders of junk e-mail include fake personalization of the messages. Thus, by including all or some part of the recipient's name (extracted from his e-mail address or from a bulk address list) in the subject line, the sender attempts to fool the recipient into believing that the message is legitimate. For example, the text "Bob, here is the deal I told you about!" might be in the subject line of a message sent to Bob@mailfront.com. This ruse alone may defeat some known filters and may induce the unwitting recipient to open the message. This trick of false familiarity is of course also well known from junk mail sent by post. Note that many of the methods used by junk e-mailers resemble those used to transmit computer viruses, which often require that recipients be tricked into opening some executable attachment.

Legislation has done little to combat the plague of junk e-mail. Indeed, there is proposed federal legislation against "unsolicited commercial e-mail," but it lacks provision for effective enforcement and has loopholes through which junk e-mailers easily slip. Like laws, evasion is often a simple exercise in semantics. For example, many junk e-mail messages include false or at best misleading statements indicating that they are not unsolicited, or not commercial. Some particularly brazen junk e-mail even states explicitly that it complies with the very proposed legislation it violates. All such statements are of course intended to confuse recipients or at least make them believe they have no recourse. Examples of actual statements received by the applicant's attorney include:

"Below is the result of your feedback form." (No feedback form was ever submitted.);

"Note: this is not a spam email. This email was sent to you because your email was entered in on (sic) one of our websites requesting to be a registered subscriber." (No such request had ever been submitted.)

"THIS IS NOT AN OFFER OR CONTRACT TO BUY INSURANCE PRODUCTS, but rather a confidential informational inquiry" (attempting to circumvent the prohibition against unsolicited commercial e-mail); and "This message is being sent in compliance of (sic) the email bill: Section 301.per section, paragraph (a) (2) (c) of S. 1618."

Still other junk e-mail filters work by searching the message for certain predetermined, prohibited keywords. Any messages that contain any of the keywords are blocked and are not passed through to the user's e-mail application. These filters thus operate in the same manner as (and often are) known filters designed to eliminate pornography or other objectionable subject matter. The problems of over- and under-inclusiveness of these systems are well documented.

The general weakness of all of the known junk e-mail filters mentioned above stems from the fact that they are passive: They attempt to determine whether a message is junk e-mail based solely on an analysis of information extracted from and relating to the message and its sending server. As such, the senders of junk e-mail, like car thieves working to defeat alarms, can evolve their techniques so as to defeat the latest filters.

What is needed is a mechanism for eliminating or at least greatly reducing the successful transmission of unwanted e-mail while still making it easy and convenient to receive wanted e-mail. In other words, e-mail from unwanted senders should be effectively blocked, with as little interference as possible with e-mail from approved senders. It should also be impossible—or at least exceptionally difficult—for junk e-mailers to bypass the filter. This invention provides such a mechanism.

SUMMARY OF THE INVENTION

The invention provides a method and system implementation for filtering electronic mail (e-mail) according to which, when a current e-mail message is received from a sender address, a challenge that requires a correct e-mail response is returned, also by e-mail, to the sender address. In the simplest embodiment of the invention, the current e-mail message from the sender address is then rejected unless the correct e-mail response is received by the user system from the sender address. All future e-mail messages from the sender address are preferably also blocked.

The challenge includes an instruction to perform an action; the correct e-mail response requires correct performance of the action. The challenge is preferably in the form of a question that must be correctly answered, and preferably includes an element that only a human can correctly interpret, such as an image, audio clip, text question whose answer requires human experience, etc. The challenge is preferably generated automatically by a corresponding software module, which may alternatively download challenges from an external system.

Challenge responses that do not meet formal criteria are preferably also rejected. Such formal criteria include response within a maximum allowed time and answering correctly within a maximum number of tries.

When a correct e-mail response is received from the sender address, that sender address is preferably included in a list of approved sender addresses and the current e-mail message may be accepted, meaning that it is passed for display to and review by the user, for example in an Inbox. The user may optionally directly specify e-mail addresses to be included in the list of approved sender addresses. Other e-mail addresses that may be assumed to be welcome and may be included directly in the approved list are those to which the user himself has initiated sending e-mail and addresses obtained from an externally compiled approved list.

When an incorrect e-mail response is received from the sender address, that sender address is preferably included in a list of blocked sender addresses. The current and future e-mail messages from the current sender address, or from any other address in the blocked list, are then rejected without further challenge. The user may also optionally directly specify e-mail addresses to be included in the blocked list; other blocked addresses from an externally compiled list may also be included. The list of blocked addresses may optionally be exported to other users.

Rather than automatically issuing challenges whenever e-mail is received from an unknown address, the system may instead notify the user of receipt of e-mail messages from such addresses and prompt him to indicate whether to send a challenge, to reject the message immediately, or to accept it without challenge.

For each challenge, a key is preferably calculated and included in the challenge. Received e-mail that includes a correctly calculated key may then be accepted without challenge (since it itself should be a challenge), or accepted directly if the key is correct and the message is from a sender address to which the user previously initiated sending a message.

BRIEF DESCRIPTION OF THE DRAWINGS

FIG. 2 is a flowchart of the main steps performed by the active, challenge-response e-mail filter according to the invention.

DETAILED DESCRIPTION

Figure 1:
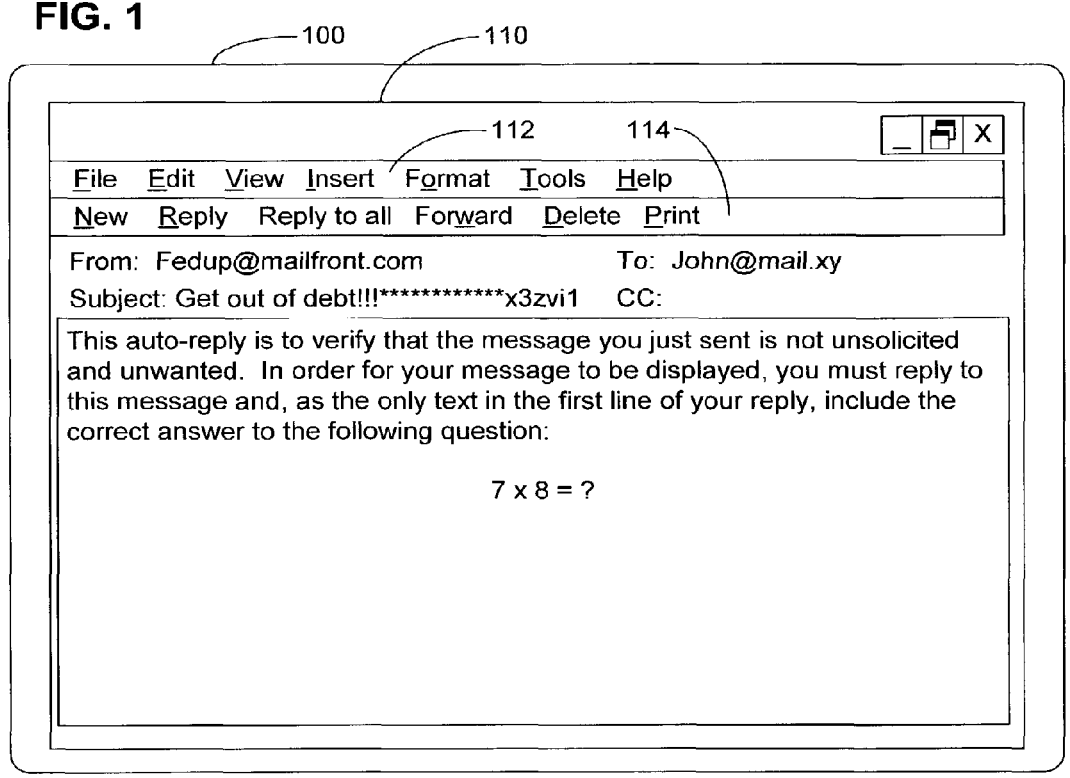
FIG. 1 illustrates an example of a text-based challenge to an e-mail sender.

In broadest terms, the invention provides a mechanism for filtering e-mail messages that eliminates or at least greatly reduces the number of unwanted messages received. Unlike existing, passive filters, the invention achieves this by requiring the sender of questionable e-mail to prove that he is in fact human and not an automated mass-mailing system: Upon receipt of a message of unknown origin, an active filter in or associated with the recipient's e-mail system returns a challenge to the sender, which the sender must correctly respond to before the original message is actually passed on to the user. The challenge will typically be a question sent in a reply e-mail message, which the sender must correctly answer, also by e-mail. The filtering mechanism according to the invention is therefore active in that it puts the "burden of proof" on the sender rather than simply trying to passively identify mass or similar unsolicited e-mailings based solely on analysis of the information received.

By now, almost everyone in every industrialized country is very familiar with the structure and handling of an e-mail message. For the sake of completeness, however, this is summarized here: The "title" of an e-mail message is usually put in a "subject line," which the user's e-mail program displays along with the sender's address, the time and date the message was received, the size of the message, and possibly other identifying and general information, usually on a single line. As part of the standard protocol, an e-mail message also includes information that is not usually displayed, at least not by default. One example of such included but non-displayed information is a header.

If the user wants to view the main text of the message, he clicks on the subject line and the text is displayed on a separate part of the display screen. The message can then be deleted, forwarded, replied to, etc., by clicking on corresponding on-screen icons. Messages typically are first displayed in an Inbox folder, but they can be moved to other folders, usually by simple dragging and dropping using a mouse. Received messages can also be grouped automatically into different folders upon receipt; for example, different users of the same e-mail program can have their own, separate default folders in which as yet unread e-mail is first placed.

Another common feature of modern e-mail programs is that they can automatically reply to received messages. This feature is often used to notify senders that the recipient is out of the office or otherwise unable to reply personally. This invention makes use of the ability to automatically send a reply to a received message.

The invention may be implemented either in each recipient's computer, or in a central e-mail server, or in an intermediate system, or in any combination of these. Here, just by way of example, it is assumed that the invention is included in the recipient's local system as part of the installed e-mail program, or as a separate filter component that cooperates with this program.

Assume by way of illustration that a sender identified as "John@mail.ext" sends a message to a recipient whose e-mail address is "Fedup@mailfront.com." Assume further that the subject line of the message is:

"Get out of debt!!!************x3zvi1"

Before this original message is passed to and listed in Fedup's e-mail Inbox, a challenge message is automatically generated and sent to John@mail.ext by Fedup's system, in particular, by the active filter according to the invention. The challenge includes a question, or a direction to perform some other action, whose correct answer or action must be part of a response that the sender returns to Fedup. The invention does not pass the original message to Fedup's Inbox unless the sender correctly responds to the challenge.

FIG. 1 illustrates the operation of a simple embodiment of the invention: In response to the original "Get out of debt!!!************x3zvi1" message, the intended recipient's (Fedup's) system returns to "John@mail.ext" a challenge, which, assuming John@mail.ext is even a valid address, would normally be displayed in a window 110 of a display 100 generated by a "John's" conventional e-mail program. (Typical toolbars 112 and 114 are also illustrated.) In this example, the challenge is part of a standard text message, and directs "John" to reply to the question "7×8=?" If, in response, John sends back to Fedup a message with the correct answer 56 as the first line, then Fedup can be almost certain that the sender at John@mail.ext is at least human, as opposed to being a mass-mailing program. The address "John@mail.ext" may then be added to a list of verified, approved, "welcome" senders so that future messages from that address will be accepted with no need for response to another challenge.

The invention may include not only the substantive response criterion that the sender must respond correctly to the challenge, but also one or more formal criteria relating, for example, to the timing and manner of response. Formal response criteria include response within a set response period and/or submission of no more than a maximum number of attempted but incorrect responses. Other formal criteria such as the sending server being configured to accept e-mail and not having open relays may also be chosen and implemented using normal design methods and heuristics.

If "John@mail.ext" responds incorrectly, or fails to meet any other included formal response criterion, then the invention infers that "John" is not a valid or welcome sender, and the original message is either blocked altogether or is placed in a "Reject" folder that Fedup can view if he so chooses. The address "John@mail.ext" is then preferably also added to list of blocked or "unwelcome" senders, so that future messages from that sender will not be challenged again, but will also not be passed to the recipient.

It is not necessary according to the invention for only complete addresses to be analyzed. Rather, address approval and blocking may be done on the basis of the domain (such as "mail.ext"), regardless of the sender's name. This is equivalent to allowing "wildcards" in the addresses. Thus, blocking or approving "*@mail.ext" would correspond to blocking or approving all mail from mail.ext. So as not to block (or pass) all messages from widely used domains, various heuristics should be implemented; these may be chosen using normal design considerations.

The active filtering mechanism according to the invention may be installed at different levels in a recipient's e-mail "stream." For example, the active filter may be installed in the central e-mail sever that first receives e-mail over a network from the sender. In this case, the invention may be used to help all users connected to the central server. The invention may also be integrated into each recipient's local e-mail program, or installed in any conventional manner (such as from a CD ROM or downloaded via the Internet) as a component that cooperates with this program.

The invention may also be installed in intermediate systems, that is, computers operating between each recipient's local e-mail application and the central e-mail server. For example, an enterprise such as a company or any other organization that maintains for different users a common connection to the general, external e-mail network (such as the World Wide Web) might prefer to install a single copy of the invention in the system that is responsible for the interface with the external network. This can be considered a "perimeter" installation inasmuch as the invention will then operate at the software and hardware "perimeter" separating the enterprise from the public part of the network, which the enterprise does not control.

As is explained in greater detail below, the invention allows not only junk e-mail to be detected and blocked, but e-mail sent from user-specified and even externally compiled addresses and domains may also be blocked. The "perimeter" installation of the invention may then be used to enable the administrator of the enterprise system to better control the flow of e-mail into and out of the enterprise as a whole. Perimeter installation will also reduce the bandwidth drain on the enterprise's e-mail system even on the way to the central e-mail servers.

The invention may also be included in a suite of junk e-mail filters. Using conventional input methods, such as moving a slider or checking a check box, the user can then adjust the level of security of his e-mail system. A relatively low setting could indicate that only conventional subject-line analysis should be used to filter incoming e-mail. The active filter according to the invention, with challenge-response, would then be the highest setting, since it has the most stringent requirement (accurate, human response) to avoid rejection.

FIG. 2 is a flowchart that shows the main steps performed by the invention: When an e-mail message arrives at the recipient's system (or at whichever system the invention is installed in), the sender's address is first compared with the addresses already in the Approved or Blocked lists 360, 362. If the message is from an approved sender, then the message is passed directly to the user's e-mail program (for example, Inbox) for display and review. If, however, the message is from a blocked address, then it may either be deleted or, preferably, placed in a Reject folder. The user may, optionally, also be notified that a message has been blocked so that he may review either the address or the message or both.

If the sender's address has not been analyzed before, then the message and its address are held in a "Pending" folder or list and a challenge is generated. The challenge may be "standardized," that is, the same for all senders, until updated by the user, or it may be generated anew for each sender. The example challenge (simple multiplication) in FIG. 1 could, for example, easily be changed for each message to include different multiplicands.

Challenge generation may be automatic, or according to user input, or a combination of both. To continue with the example of a simple two-operand arithmetical challenge such as "7×8=?", the active filter according to the invention (in particular, a challenge generation module—see below) could generate such challenges from a basic generalization, such as "M Op N=?" where M and N are chosen randomly from some predetermined set of whole numbers and Op is an operator chosen randomly from a group such as addition, subtraction and multiplication. Such randomization would enable the system to easily generate different challenges for different potential junk e-mailers.

The challenge is then sent automatically as a reply to the sender (here, John@mail.ext). The system then waits for the sender's response to the challenge. A maximum response time is preferably implemented; failure to respond correctly in the allotted time leads to the original message being blocked and the sender's address being put in the Blocked list.

If the sender does respond, then the response is checked to determine if it is correct. If it is, then the sender's address is put in the Approved list and the original message is passed to the recipient. It is of course possible that a valid, welcome sender may answer incorrectly by mistake. Moreover, a welcome sender may send the original message and then log off and leave his computer for longer than the expected turnaround time for an immediate response to a challenge. According to the invention, senders may therefore optionally be given more than one opportunity to respond to a challenge before they are blocked and/or they may be given a time for response long enough to take into account normal e-mail habits. If the number of permitted response attempts (which may be one) has not yet been exceeded, and/or the response period has not yet expired, then a new challenge is preferably sent to the sender. If the number of attempts and/or the allowed response time has been exceeded, then the sender's address is added to the Blocked list and the original message itself is either deleted or placed in the Reject folder.

It would also be possible—but would provide much weaker security—for purely formal criteria to be sufficient. In other words, the challenge "question" might be a "null" question, meaning that any response sent from the same sender address within a set period might suffice to have the sender address be included in the Approved list. For example, the challenge could simply be "Reply to this e-mail message." This minimum-security challenge could be defeated with an auto-reply feature in the sender's system, but it would work against the many junk e-mailers who send messages from invalid, or frequently changing, addresses. Even if the sender's system generates an automatic response, the invention would serve to confirm that the junk e-mail sender's address is valid and relatively stable—this in itself would make it easier to identify the sender and possibly stop his junk e-mail activities using other techniques, including legal means.

Even at this point, the advantages of the invention should be clear: Few senders of mass junk mail (especially where the senders are automated) will be able to respond to individual challenges. Even if the junk e-mailer is determined enough to try, responding individually to even a hundred intended recipients (to say nothing of thousands or millions) would greatly increase the burden and cost of sending junk e-mail. As an added advantage, assume that the junk e-mailer sends 10,000 junk e-mail messages from his own computer, using a valid "From" address, and that all of the 10,000 recipients are wise enough to have installed the invention. The junk e-mailer's computer would then receive 10,000 challenge messages, which, one hopes, would inconvenience the junk e-mailer enough to act as a deterrent.

General System Configuration

Figure 3:
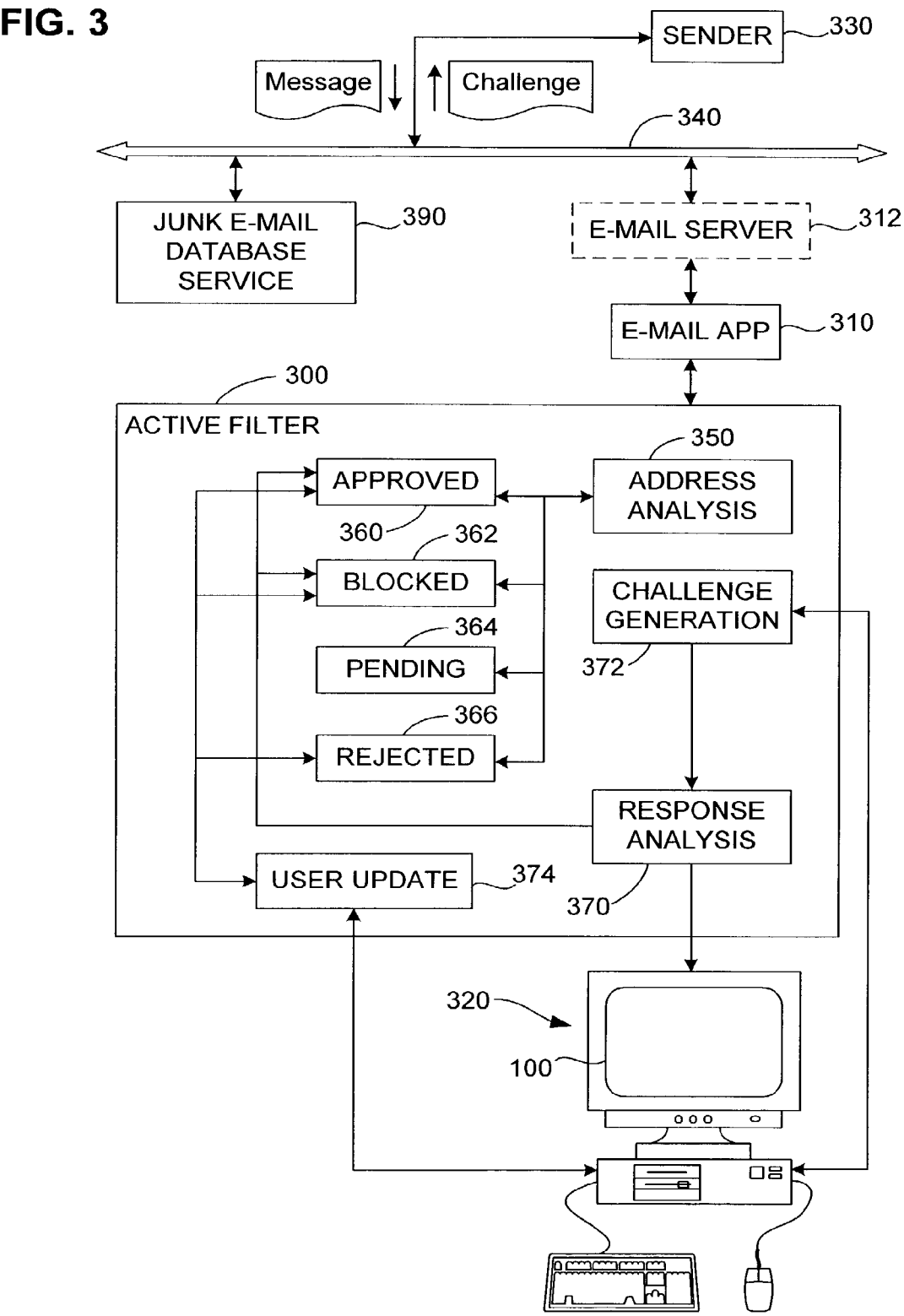
FIG. 3 is a block diagram of the main hardware and software components used in the e-mail filter system according to the invention.

FIG. 3 shows the main components of the active filter 300 according to the invention, which is included within or cooperates with any conventional e-mail application 310 such as Microsoft Outlook, Eudora, etc., or the conventional e-mail software of any conventional e-mail server. As is mentioned above, the active filter 300 may be included as part of the user's local e-mail application 310, or within the e-mail server 312 via which the user receives and sends e-mail. The active filter 300 is shown as a separate sub-system merely for the sake of clarity. Similarly, at least the e-mail application 310, and preferably the active filter 300 as well, are installed as software components, that is, stored, as executable computer instructions and related data in the user's local computer system 320. Again, they are shown separately for the sake of clarity.

A sender 330 sends an e-mail message to the recipient's e-mail application 310 via a network 340 such as the Internet and the recipient's e-mail server 312. Before the application 310 displays the message, however, it is first passed to the active filter 300. An address analysis module 350 checks the lists of approved, blocked and pending addresses 360, 362, 364, respectively, to determine whether analysis is needed at all. Messages from approved addresses may be passed directly to the user's Inbox (or other designated folder) using the normal routines in the e-mail application 310. Messages from blocked addresses may be sent directly to a Rejected folder 366 (preferably within the e-mail application itself 310).

Any message from an address that is in the Pending buffer 364 is passed to a response analysis module 370, which compares the response (if any) in the message with the correct response. If the response is correct, then the address record is removed from the Pending buffer 364 and may be entered into the Approved list 360. The original message (held in the Pending buffer 364) can then be passed to the e-mail application 310 for normal display to the user. Future e-mail from any address in the Approved list 360 can then be accepted and passed on to the user without further challenges—welcome senders of e-mail will therefore need to correctly answer a challenge only once. If the response is incorrect, the sender may optionally be given yet another try. If a "retry" possibility is implemented, the decision as to whether to allow another try may be based on whether a set response period has expired (which can be determined by comparing the original transmission time against the time and/or date information available from the operating system) and/or whether a maximum number of failed attempts has been exceeded (which can be tracked by incrementing a counter in the Pending buffer record), or on other formal response criterion.

Note that the invention may be used together with other e-mail filters. Any message that contains a prohibited keyword, for example, or fails some other test, such as having a content or structure indicative of junk e-mail (such as strings of random characters after several blanks spaces or asterisks in the subject line, or in the message text), could be automatically rejected and the sender's address may be blocked, regardless of the response.

Assuming that the response is incorrect and that the sender is to be allowed another try, a challenge generation module 372 either resends the original challenge or generates a new challenge that is sent to the sender.

A sender may send more than one message during a given response period. There might therefore be more than one pending record for the same address in the buffer 364. If the sender correctly responds to the first challenge but allows the period for the second to expire, then his address might end up in both the Approved and the Blocked lists. One way for the address analysis module 350 to handle this possibility is to group all pending messages by address, or to scan the Pending buffer for duplicate addresses, whenever a new message is received. The results of the first response analysis corresponding to the duplicated address can then be applied to all messages from the same group—one correct response from a sender will cause all the messages from that address to be "released" for display and response failure will cause all the messages to be rejected.

Another way to handle this possible contradiction is for the address analysis module to periodically compare the Approved and Blocked address lists—any address that is both blocked and approved should probably be approved because the sender will have correctly responded to at least one challenge. Alternatively, the contradictory status can be flagged for the user, who may then manually decide whether to approve or block the ambiguous address.

If the address of the message is new, that is, is not found in any of the lists 360, 362, 364, then the challenge generation module 372 creates and transmits the challenge back to the sender.

The invention preferably includes a user update module 374 with which the user communicates using any conventional input device. Upon user activation (for example by clicking on a displayed icon or selecting this feature from a menu), this module 374 allows the user to view, edit, add and delete addresses in the Approved and Blocked lists 360, 362, and preferably to easily move an address from one list to the other. Moving addresses and messages between e-mail folders using simple "drag-and-drop" is a known feature of most modern e-mail programs. For example, a user's friend may have failed to respond correctly, or on time. He will then notice that his mail never seems to reach the user. In this case the user can simply move the friend's address to the Approved list. Conversely, a junk e-mail system, aware of the invention, may have been lucky enough to guess a correct response; upon seeing the junk e-mail, the user can then manually put the unwelcome address in the Blocked list 362.

Many users want to receive some mass-mailed e-mail, for example, a daily summary of news headlines, or mailings from organizations to which they belong, or even solicitations such as notices of last-minute deals from airlines. Such welcome senders would not be able to respond correctly to a challenge. The user can then enter these known, welcome addresses directly into the Approved list via the user update module 374 using conventional input techniques.

FIG. 3 also shows a "Junk E-Mail Database Service" 390 connected to the network 340 and accessible to the user's e-mail program 310 and therefore to the active filter 300. This optional system may provide different services depending on any given implementation of the invention. In one configuration, the service 390 itself hosts the active filter 300, and filters e-mail on behalf of users who receive their e-mail via the service 390. In another configuration, the service 390 makes available to users updates of the active filter, including challenge updates. These features are described further below.

Figure 4:
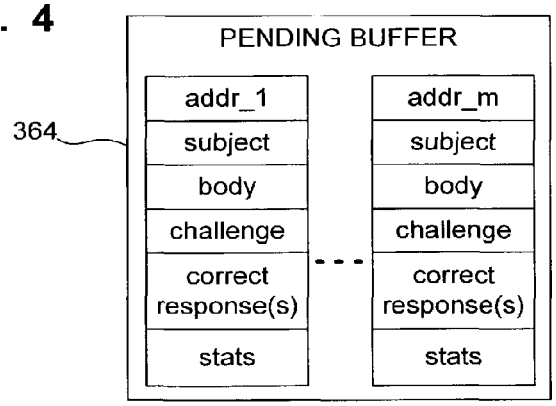
FIG. 4 illustrates an example of the structure of a buffer used to store information about e-mail messages whose senders are being challenged to prove they are human.

FIG. 4 shows an example of the Pending buffer 364, which holds data concerning messages being held pending response (or lack thereof) to a challenge. For each potential junk e-mail message, a record is preferably included in the buffer that has, as fields, data such as the senders' addresses (addr_1, . . . , addr_m), the subject lines and text bodies, the respective challenge(s), correct response(s) (assuming individualized challenges), and statistics such as the time the challenge was sent (the start of the response period), the number of response attempts, etc.

Challenges

The challenge illustrated in FIG. 1 is entirely textual, and can be implemented easily in all modern e-mail programs: Regardless of the e-mail formatting used, the challenge will still be understandable, and a simple "Reply" message will suffice to return the response. This challenge format has the added advantage that the user can easily create challenges.

The line connecting the user system 320 and the challenge generation module 372 in FIG. 1 illustrates the (optional) ability of the user to select or change challenges. Accordingly, in this manual-challenge embodiment, the user can create new challenges or edit existing ones. For example, the user could change the multiplicands in the challenge "7×8=?"; he should then enter the correct answer in the response analysis module 370 using any conventional input arrangement.

Once junk e-mailers become aware of a new filter, they usually set about developing automated ways to defeat it. It would thus be possible for particularly clever junk e-mailers to try to use a parsing program to parse the challenge and automatically produce a correct response. Allowing the user to create challenges and input them (using any conventional input technique) to the challenge generation module 372 may help overcome this potential weakness. If the text challenge requires specific or even general knowledge not commonly within the realm of computers, then automatic response generation will be difficult if not impossible. For example, no parser would correctly respond to the challenge: "What is my daughter's first name?" Indeed, this is also an example of a challenge that would exclude most human junk-mailers. Other challenges could easily be written to block e-mail from people who do not readily know, say, algebra or Swedish or classical guitar, or a password.

Figure 5:
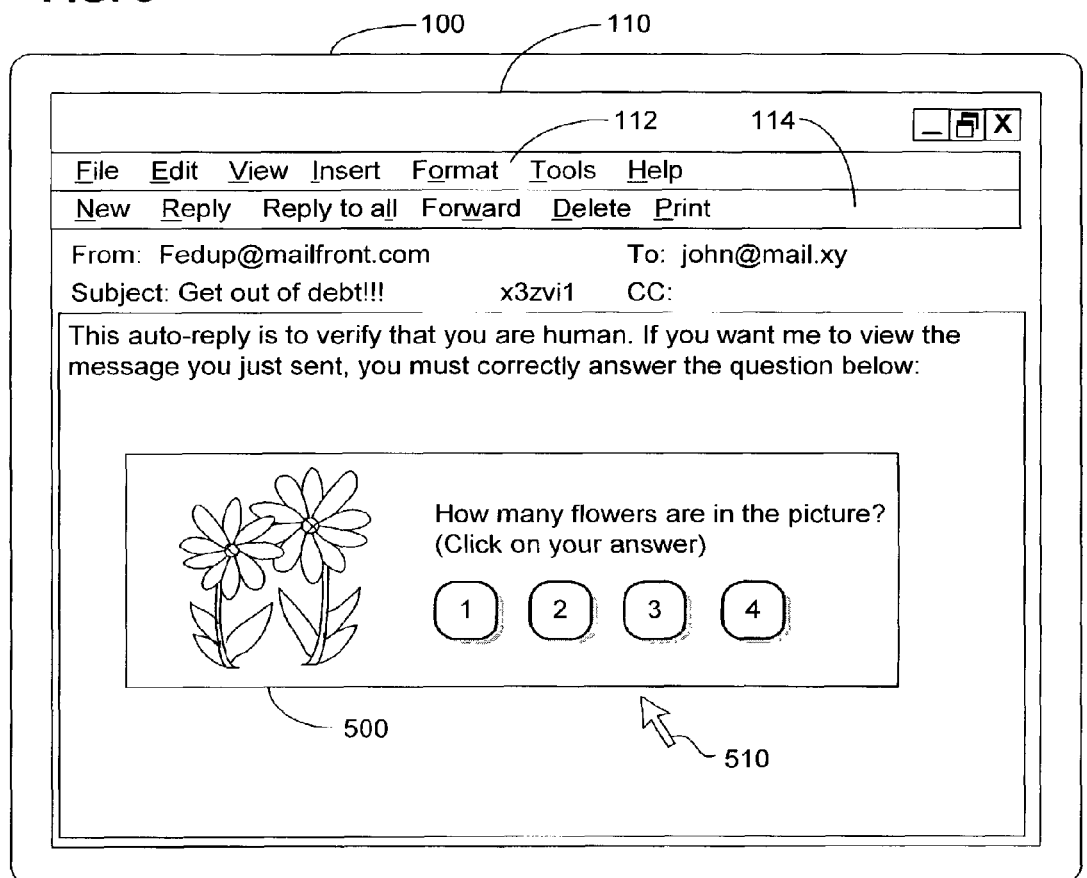
FIG. 5 illustrates an image-based challenge with an automatically launched, one-click response.

Most modern e-mail programs allow messages to be sent in or include elements created using mark-up languages such as HTML and image formats such as JPEG. The preferred embodiment of the invention takes advantage of this capability to generate challenges that cannot be parsed at all, because the challenges require correct interpretation of an image. FIG. 5 illustrates an example of such a challenge.

In FIG. 5, the challenge has been sent to the sender as before, but the challenge message includes an image 500, which includes a challenge question as part of the image. In the illustrated example, two flowers are shown, and the challenge is to correctly indicate the number of flowers. To make responding easy and relatively fail-safe, in the illustrated example, four input fields (the "button" icons labeled 1-4) are included in the image. To respond to the challenge, the sender may simply position a cursor 510 over the button indicating the correct answer and then "click" on the button. By including conventional scripting along with the challenge message, the sender's (John@mail.ext's) e-mail program can then automatically send the response back to the recipient (Fedup@mailfront.com) as soon as the sender clicks on his choice of answer. Note that an image-based challenge tests that the sender is human in two ways: First, the sender must see and interpret the picture and the question; second, he must perform the physical acts of positioning the cursor 510 over the correct answer button and then also click a mouse or similar input device.

One other advantage of image-based challenges (with text also in the image format) that can be answered by clicking on multiple-choice buttons is that they can be used readily for languages whose alphabet, symbols or characters are not supported by standard e-mail programs or browsers.

Figure 6:
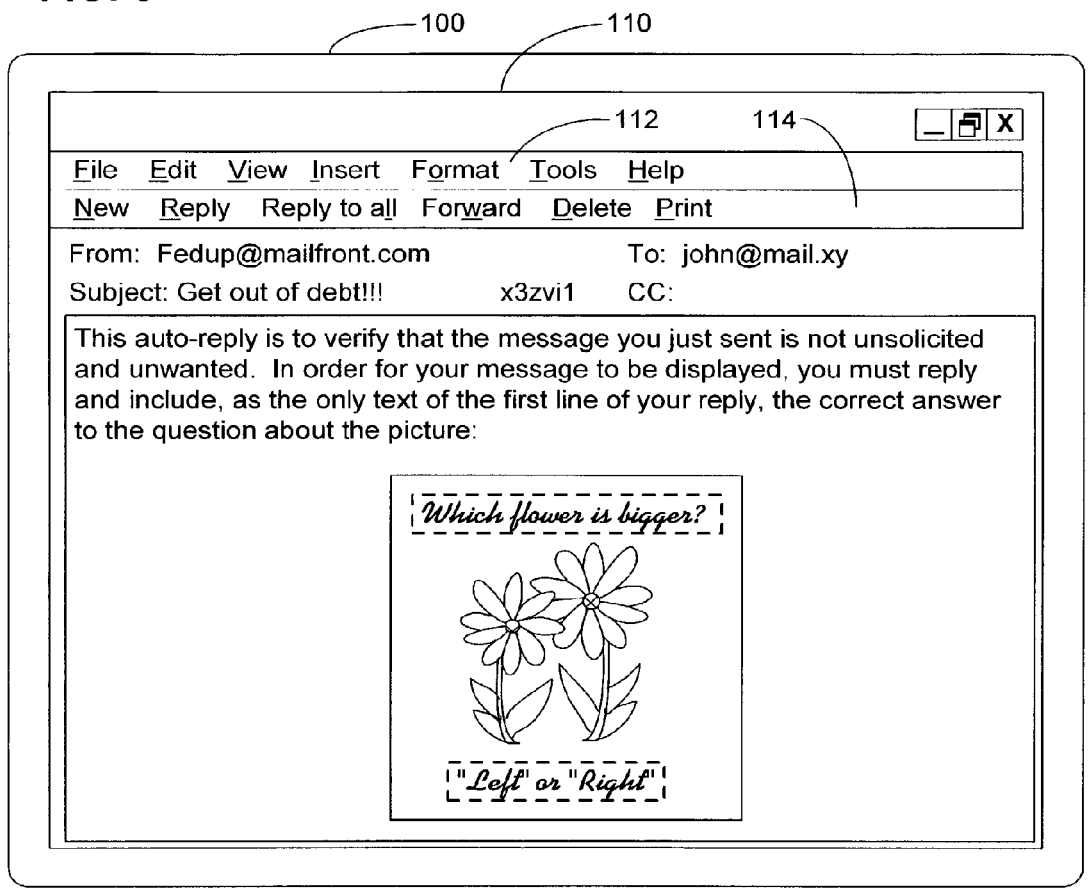
FIG. 6 illustrates an image-based challenge that requires a manually typed textual response.

FIG. 6 illustrates a challenge that combines image interpretation and a manual, text response. In this case, to respond correctly, the sender must physically type "right" into a response message. FIG. 6 also illustrates how any text included in a challenge image is preferably put in a font, color, style, etc., and/or is "obscured" with other graphics (such as the surrounding dashed boxes) so as to defeat any attempts to "decipher" the image using optical character recognition.

Other non-textual challenges may also be generated according to the invention. For example, the challenge could include an audio file (for example, in MP3 format), or a moving or changing image (in, for example, MPEG format), with a challenge question or action that presupposes an ability to interpret and/or react to the audio or active-image challenge. The challenge question could, for example, be spoken in the audio file, or could be presented as scrolling text. These non-textual and indeed non-visual challenges may of course be combined with the text- and image-based challenges described above.

In the preferred embodiment of the invention, the challenge generation module 372 automatically chooses which challenge to issue to senders, for example, from a database of challenge texts and/or images, etc., included as part of the active filter. One advantage of this is convenience: The user does not need to think of appropriate challenges, so that different challenges can easily be issued to even a large number of different sender addresses. Note that it will often not be necessary to have available a large number of different challenges—even a single "standard" challenge will still require human interpretation and action for correct response. Whenever a new challenge is required, the module 372 may then, for example, choose it randomly from the database. Another advantage is that automatic generation ensures that challenges will be in the correct format. Still another advantage is that new challenges can be downloaded from a provider via the Internet, for example as part of a periodic update routine. Such automatic updating via the Internet is a well known procedure used, for example, by all major providers of anti-virus software.

Much junk e-mail is sent from forged addresses. Any challenge sent to such an address will typically result in the return of a "bounce" error message, that is, an e-mail message stating that the challenge was undeliverable. The From address of such an error message is usually "postmaster@domain.ext" or "route@domain.ext" where "domain.ext" is the domain name and extension used in the junk e-mail message. The text of the undelivered message is, moreover, typically included as part of the error message, as well as the address to which the message could not be delivered. This provides yet another way for the response analysis module 370 to determine that a message is junk: Whenever a message is received from, for example, "postmaster" or "route," then the module can check the domain name and text to determine which challenge the error message corresponds to. The sender address that caused the bounce can then be assumed to have sent a junk e-mail and can therefore be placed in the Blocked list.

The response analysis module 370 preferably also immediately blocks the sender address and the original e-mail message if, instead of a correct response to the challenge, an auto-reply message is returned. That a message is generated by auto-reply can be determined using known methods. For example, according to current e-mail standards, all auto-reply messages have an "x-" header that specifies that the message is "precedent bulk."

Still another situation that the active filter preferably automatically interprets as indicating junk e-mail is when an incoming e-mail message has, as its "From" address, the user's own address. In other words, if the "From" address is identical to the "To" address, then the message can be assumed to be junk. Because blocked messages and their addresses are preferably stored in the Reject folder and Blocked list for later review, the user will still be able to retrieve any message that he deliberately sent to himself, for example as the result of sending a "Reply to all" message. Alternatively, by keeping track of identifying information for any "Reply to all" message sent, for example, the message body, the active filter could automatically approve without challenge any received message that has the identifying information.

Anti-"Ping-Ponging"

Assume that the invention is installed in the computers of two different users U1, U2, neither of whom are junk e-mailers. When U1 sends a first message to U2, U2's computer will return a challenge C1 to U1. U1's active filter will interpret this challenge C1 either as an incorrect response, or as incoming e-mail, which will cause it to issue a challenge C2 to U2, whose active filter will interpret C2 either as an incorrect response to C1, causing blocking of U1's address, or as yet another message, causing generation of yet another challenge C3, and so on. The result will therefore be either that U1 and U2 block each other's addresses, or that their active filters will begin an endless series of "ping-ponging" challenges.

One way to prevent, or at least cut off, ping-ponging is for the active filter to set a limit on the maximum number of challenges issued to any given address during some predetermined time period. If the limit is reached, and if all messages received from the sender are at least substantially identical, and if they are not auto-replies, then the active filter can assume that the two systems are ping-ponging challenges to each other. The active filter can then handle this situation in different ways depending on user or designer preferences. For example, the first returned message in a ping-pong sequence can then be passed to the Inbox for review. Alternatively, if the active filter determines that ping-ponging is happening, then after a predetermined number of "rounds," the active filter could notify the user, for example, using a pop-up window, indicate the remote address involved, and prompt the user to decide whether to accept the original message or reject it (and block the sender's address) without further challenge.

In the preferred embodiment of the invention, ping-ponging is prevented by including a key in each challenge generated, for example, in the header. Upon receipt of any message that includes a valid key, the active filter will then know that the incoming message is a challenge and may then automatically approve the sender address and pass the message to the user's Inbox without issuing a challenge.

The key may be a single number generated using, for example, a weak algorithm such as a checksum, or a strong algorithm such as those used to for public-key cryptography, or any other known encryption routine. The basis of the key is preferably all or some portion of the outgoing (challenge) message, including the From and To addresses. Other bases may of course also be used, such as those that are functions of the time, or some random number. This information will be available to the active filter in the receiving system, so that it too can calculate the key. If the key is correct, then the recipient system knows that the message was sent by a system that incorporates the invention and can probably be trusted.

It would be possible for particularly determined and skilled junk e-mailers to install the invention in their own systems, then generate false messages to themselves "from" the addresses to which they wish to send junk e-mail. The "challenge" their systems would then send would be the junk mail message, with a valid key, which might pass through the active filter of the recipient's system at the "real" addresses. The recipient's system will not have sent any message to the "From" address of the junk e-mail, however, so this fact can be used to override the key and block the message and junk e-mailer's address: Since the key is preferably included only in issued challenges, the recipient should not receive any "challenge" with a valid key from any address to which it has not initiated e-mail exchange. An incoming message (usually a challenge) can therefore be passed directly to the Inbox of the recipient if the incoming message has a valid key in its header and the recipient's system earlier initiated a message to the sender of the incoming message.

Automatic generation of challenges also helps prevent this deception, since it can ensure that all challenges must conform to a predetermined format. Even if a correctly calculated key is found in a message header, but the message body does not conform to the predetermined format, then the active filter will know that the incoming message is not a valid challenge. Other conventional filter mechanisms may also be employed in this case to detect junk content.

Imported and Dynamic Address Lists

In the embodiments of the invention described above, a sender's address is included in the Approved list 360 when the sender correctly responds to a challenge. This is not the only way to build up this list in the preferred embodiment of the invention. To avoid sending challenges to senders who are already known to be welcome, the active filter 300 according to the invention preferably puts in the Approved list 360 any addresses to which the user himself manually sends or has sent original (and, possibly, reply) e-mail messages. The filter 300 could also import the addresses in the "address book" of the user's e-mail program 310. The Approved list can thus be built up dynamically.

In another embodiment of the invention, externally compiled, approved addresses are imported for inclusion in the user's list 360. Assume for example that the user is a new employee at a company. His computer's Approved list could then be loaded initially with the addresses of all the other employees, of known customers and vendors, etc. Such company-wide Approved lists could also be updated periodically by a system administrator. As the user sends and replies to e-mail, his Approved list will therefore grow dynamically to include addresses approved both "globally," that is, from the company-wide list, and "locally," that is, approved as the result of correct challenge responses.

Addresses known to be globally unwelcome or prohibited could similarly be downloaded or stored in the Blocked list 362. These "globally" blocked addresses could also be made "undeletable" by marking them appropriately and coding the user update module 374 so that it does not allow the user (but rather only an administrator) to remove these addresses from the Blocked list 362 or move them to the Approved list 360.

Dynamic compilation of the Blocked list 362 may also be used in implementations in which the active filter 300 is included in the central e-mail server 312, to which many users are typically connected. If the address of a junk e-mailer is blocked centrally, not only would this prevent the junk e-mail from reaching all those connected to the server, but it would also prevent the waste of bandwidth. The users connected to the server could also be allowed to participate in building up the Blocked list 362. In this case, for example, if more than a minimum number of users indicate to the central sever that a particular address is used for junk mail, then the central server could include it in the global Blocked list. In order to prevent a coordinated "attack" against a legitimate sender, the administrator of the central server should preferably review all such globally blocked addresses.

FIG. 3 also illustrates an extension of the concept of a central list of blocked addresses. As shown in FIG. 3, a third-party "Junk E-Mail Database Service" 390 may be included and made accessible to the user via the network 340. According to this embodiment of the invention, the service 390 preferably includes a copy of the active filter 300, as well as any other conventional junk e-mail filters. The service preferably not only detects junk e-mailers' addresses (and/or domains) using the invention, but also actively seeks them out. Regardless of the methods used to identify junk e-mailers' addresses, the service 390 includes a Blocked list, preferably in the same format as those used in the active filter 300 of user systems. The Blocked list in the service 390 is therefore a global list that may be accessed by users and downloaded into their respective Blocked lists 362. The service 390 may provide blocked address lists by subscription, or it may be associated with the e-mail service provider (usually, but not necessarily, the same as the user's Internet Service Provider). Users who subscribe to the service 390 may then download the updated global Blocked list, which is added to the locally blocked addresses in each user's respective system.

Figure 7:
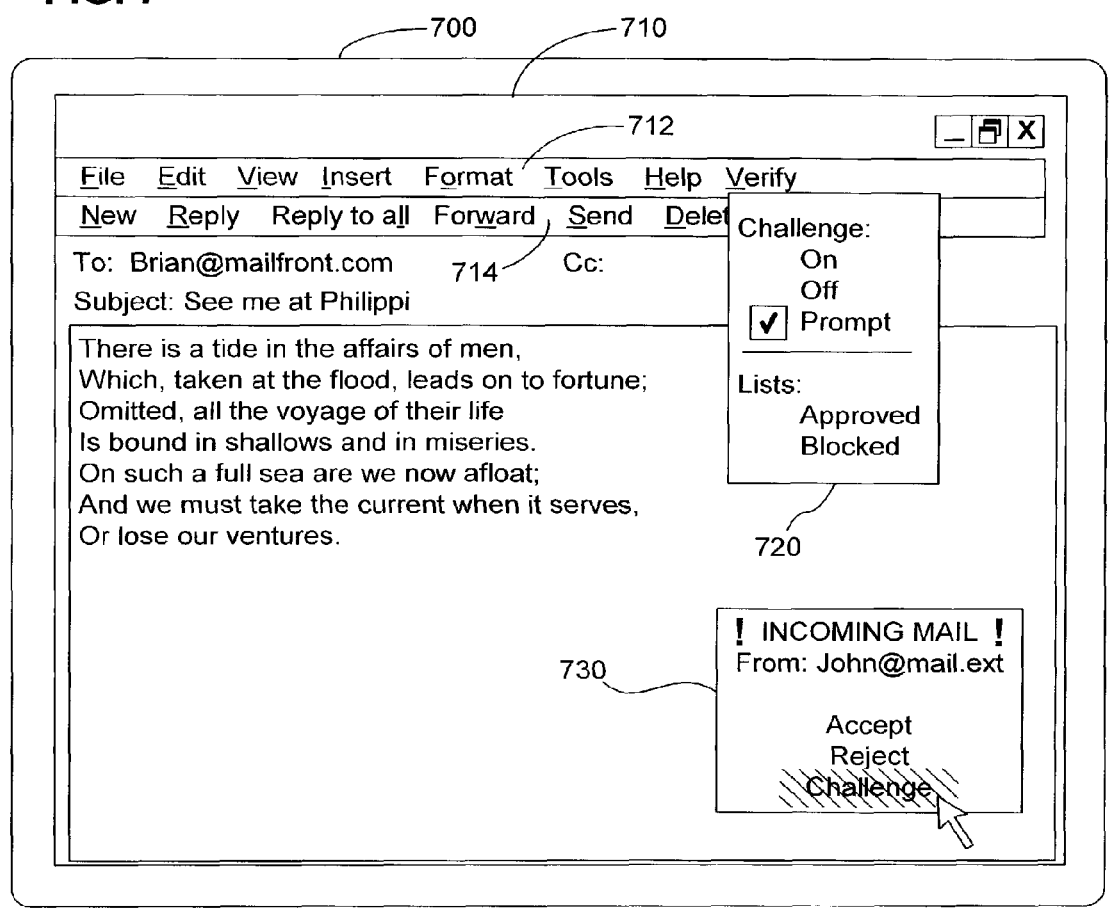
FIG. 7 illustrates an example of a user interface that enables a user to turn the invention on and off and to activate prompted message challenging.

FIG. 7 illustrates one example of a graphical interface that allows the user to control the active filter according to the invention, and that also allows for prompted challenge generation. In the illustrated example, the user is writing an e-mail message to Brian@mailfront.com using a standard e-mail program; the interface may be included in other applications as well, for example, a browser. A window 710 is shown on a display screen 700, along with toolbars 712 and 714. In this example, the user accesses the features of the active filter via a drop-down menu 720, which is activated by clicking on a "Verify" tool on toolbar 712. Any other conventional access arrangement may of course be implemented instead.

The drop-down menu allows the user to turn the active filter on or off, that is, to enable or disable the challenge-response mechanism of the invention, and, if implemented, to activate prompted challenges. Additional features that the user may be allowed to access include the Approved and Blocked lists so that addresses stored in these lists may be added, deleted, edited or moved.

When prompted challenging is activated, the active filter does not automatically generate challenges and analyze responses for e-mail messages from as yet unclassified (approved, blocked or pending) sender addresses. Instead, when the user's e-mail program receives a message from an unclassified address, the challenge generation module 372 (or some other dedicated module) causes a pop-up window 730, call-out, etc. to be displayed to notify the user that unclassified e-mail is incoming, that is, has been received but not yet approved for display. The address of the incoming e-mail and, optionally, all or part of the subject line, are also preferably displayed. By clicking on the desired choice, the user can then select to directly approve the address and permit the message to be entered in his Inbox, to block the address and reject the message, or to instruct the active filter 400 to generate a challenge and act according to any response or lack of response. In FIG. 7, for example, the user has chosen to have the message from John@mail.ext challenged.

What is claimed is:

1. A method for filtering electronic mail (e-mail) sent to a user, the method comprising:
   receiving a current e-mail message from a sender address, the current e-mail message received from a computing device associated with the sender address, and received at a user system configured to manage received e-mail;
   determining that a current level of security has been selected by the user, wherein the e-mail system has a plurality of different levels of security ranging from high to low, each level associated with the different set of one or more e-mail filters;
   sending an active image-based challenge associated with the current level of security, in which a challenge question is part of a moving or changing image, wherein the challenge question is presented as scrolling text that is part of the moving or changing image and requires a correct e-mail response to be selected from a provided set comprising a plurality of possible e-mail responses, the active image-based challenge sent from the user system to the computing device associated with the sender address, the active image-based challenge sent via e-mail over a communications network; and
   executing a software application stored in memory at the user system, wherein execution of the software application by a processor blocks the current e-mail message from the sender address from being displayed to the user unless the correct e-mail response is received by the user system from the sender address, the correct e-mail response further indicating that the computing device associated with the sender address is configured to accept e-mail and does not include an open relay.

2. The method of claim 1, wherein the active image-based challenge is created by the user to whom the current e-mail message is sent, and further comprising initially receiving the active image-based challenge from the user.

3. A system for filtering electronic mail, the system comprising:
   an e-mail application stored in memory and associated with a recipient e-mail address;
   a filter application stored in memory and executable by a processor to intercept electronic mail sent from a sender address to the recipient e-mail address prior to delivery of the electronic mail to the e-mail application, the filter communicatively coupled to an intermediate storage buffer;
   an address analysis module stored in memory and executable by a processor to determine whether the sender address of the intercepted electronic mail is an approved sender, wherein the intercepted electronic mail is delivered to the e-mail application for execution thereby allowing user access only if the sender address is an approved sender, and wherein the intercepted electronic mail is transferred to the intermediate storage buffer by the filter application when execution of the address analysis module determines that the sender address is not an approved sender, the intermediate storage buffer configured for temporary storage of the intercepted electronic mail until a subsequent determination is made to deliver the electronic mail to the e-mail application or to delete the intercepted electronic mail from the buffer;
   a challenge generation module stored in memory and executable by a processor to:
     determine that a current level of security has been selected by the user, wherein the e-mail system has a plurality of different levels of security ranging from high to low, each level associated with the different set of one or more e-mail filters;
     issue an active image-based challenge message associated with the current level of security, in which a challenge question is presented as scrolling text that is part of a moving or changing image to the sender address, the challenge question requiring a correct e-mail response to be selected from a provided set comprising a plurality of possible e-mail responses; and
   a response analysis module stored in memory and executable to:
     receive a challenge response message from the sender address, and
     determine whether the challenge response message includes both an indication that the sender address is configured to accept e-mail and is not associated with an open relay and the correct e-mail response to the active image-based challenge, wherein execution of the address analysis module will identify the sender address as an approved sender when the challenge response message includes both the indication and correct answer to the challenge question and allow for delivery of the intercepted electronic mail in the intermediate storage buffer to the e-mail application, and the execution of the response analysis module will provide for deletion of the intercepted electronic mail when the indication is absent, the challenge response message includes an incorrect answer to the challenge question, or a challenge response message with the correct indication and correct answer are not received by the response analysis module within a predetermined period of time.

4. The system of claim 3, wherein the challenge generation module is further executable by the processor to access an external provider of challenge questions and download a challenge question to be issued to the sender address as a part of the active image-based challenge.

5. The system of claim 3, wherein the challenge generation module is further executable by the processor to generate the active image-based challenge in response to user input received via a graphical user interface.

6. The system of claim 5, wherein the user input received via the graphical user interface includes a user selection of a specific challenge question to be posited to the sender address.

7. The system of claim 5, wherein the user input received via the graphical user interface includes an indication for all future active image-based challenges to be generated automatically.

8. The system of claim 5, wherein the user input received via the graphical user interface includes an indication for all future active image-based challenges to be generated individually.

9. The system of claim 3, wherein the challenge generation module is further executable by the processor to cause the display of a notification of receipt of electronic mail that has not been approved for delivery to the e-mail application, the notification including an option to generate the active image-based challenge and transfer the electronic mail to the intermediate storage buffer.

10. The system of claim 3, wherein the challenge generation module is further executable by the processor to cause the display of a notification of receipt of electronic mail that has not been approved for delivery to the e-mail application, the notification including an option to not generate the active image-based challenge and to allow for delivery of the electronic mail to the e-mail application.

11. The system of claim 3, wherein the active image-based challenge is created by the user to whom the current e-mail message is sent, and wherein the challenge generation module receives the active image-based challenge from the user.

12. A method for electronic mail delivery, the method comprising:
intercepting an electronic mail message sent from a sender address and addressed to a recipient address, wherein interception of the electronic mail message occurs prior to delivery of the electronic mail message to the recipient address;
determining whether the sender address is that of an approved sender, wherein the electronic mail message is stored in an intermediate storage buffer until the determination is made that the electronic mail message is that of an approved sender;
delivering the intercepted electronic mail message from the intermediate storage buffer to the recipient address for access by a user associated with the recipient address when the determination indicates that the intercepted electronic mail message is from an approved sender;
determining that a current level of security has been selected by the user, wherein the e-mail system has a plurality of different levels of security ranging from high to low, each level associated with the different set of one or more e-mail filters;
issuing an active image-based challenge associated with the current level of security, in which a challenge question is part of a moving or changing image to the sender address when the determination indicates that the intercepted electronic mail message is not from an approved sender, wherein the challenge question is presented as scrolling text that is part of the moving or changing image and is to be responded to by a user associated with the sender address, and wherein the challenge question that is part of the moving or changing image requires a correct e-mail response to be selected from a provided set comprising a plurality of possible e-mail responses;
analyzing a message received in response to the active image-based challenge, wherein the intercepted electronic mail is deleted from the intermediate storage buffer when the message received in response to the active image-based challenge fails to include an indication that the sender address is configured to accept e-mail and is not associated with an open relay and the correct response to the challenge question, and delivering the intercepted electronic mail message from the intermediate storage buffer to the recipient address for access by the user associated with the recipient address when the message received in response to the active image-based challenge includes the indication and the correct response to the challenge question and is received within a predetermined period of time, and adding the sender address to a list of approved senders whereby the sender address is not subject to a future challenge upon receipt of subsequent electronic mail messages from the sender address.

13. The method of claim 12, further comprising:
accessing an external provider of challenge questions; and
downloading a challenge question to be issued to the sender address as a part of the active image-based challenge.

14. The method of claim 12, further comprising receiving user input concerning the generation of the active image-based challenge.

15. The method of claim 12, further comprising:
generating a notification to the user associated with the recipient address, the notification indicating interception of an electronic mail message from a non-approved sender; and
receiving input from the user associated with the recipient address in response to the notification, the input indicating the challenge question to be issued to the sender address as a part of the active image-based challenge.

16. The method of 12, wherein the active image-based challenge is created by the user to whom the current e-mail message is sent, and further comprising initially receiving the active image-based challenge from the user.

17. A non-transitory computer-readable storage medium having embodied thereon a program, the program being executable by a processor to perform a method for electronic mail delivery, the method comprising:

intercepting an electronic mail message sent from a sender address and addressed to a recipient address, wherein interception of the electronic mail message occurs prior to delivery of the electronic mail message to the recipient address;

determining whether the sender address is that of an approved sender, wherein the electronic mail message is stored in an intermediate storage buffer until the determination is made that the electronic mail message is that of an approved sender;

delivering the intercepted electronic mail message from the intermediate storage buffer to the recipient address for access by a user associated with the recipient address when the determination indicates that the intercepted electronic mail message is from an approved sender;

determining that a current level of security has been selected by the user, wherein the e-mail system has a plurality of different levels of security ranging from high to low, each level associated with the different set of one or more e-mail filters;

issuing an active image-based challenge associated with the current level of security, in which a challenge question is presented as scrolling text that is part of a moving or changing image to the sender address when the determination indicates that the intercepted electronic mail message is not from an approved sender, wherein the challenge question that is part of the moving or changing image is to be responded to by a user associated with the sender address, and wherein the challenge question that is part of the moving or changing image requires a correct e-mail response to be selected from a provided set comprising a plurality of possible e-mail responses;

analyzing a message received in response to the active image-based challenge, wherein the intercepted electronic mail is deleted from the intermediate storage buffer when the message received in response to the active image-based challenge fails to include an indication that the sender address is configured to accept e-mail and is not associated with an open relay and the correct response to the challenge question, and delivering the intercepted electronic mail message from the intermediate storage buffer to the recipient address for access by the user associated with the recipient address when the message received in response to the active image-based challenge includes the indication and the correct response to the challenge question and is received within a predetermined period of time, and adding the sender address to a list of approved senders whereby the sender address is not subject to a future challenge upon receipt of subsequent electronic mail messages from the sender address.

18. The non-transitory computer-readable storage medium of claim 17, wherein the active image-based challenge is created by the user to whom the current e-mail message is sent, and further comprising initially receiving the active image-based challenge from the user.

* * * * *